(12) United States Patent
Kulik et al.

(10) Patent No.: US 11,431,425 B2
(45) Date of Patent: Aug. 30, 2022

(54) MEASURING AN END-TO-END DELAY(S) IN A DISTRIBUTED COMMUNICATIONS SYSTEM

(71) Applicant: Corning Research & Development Corporation, Corning, NY (US)

(72) Inventors: Shlomi Kulik, Petach Tikva (IL); Shirish Nagaraj, Pleasanton, CA (US)

(73) Assignee: Corning Research & Development Corporation, Corning, NY (US)

( * ) Notice: Subject to any disclaimer, the term of this patent is extended or adjusted under 35 U.S.C. 154(b) by 148 days.

(21) Appl. No.: 17/030,569

(22) Filed: Sep. 24, 2020

(65) Prior Publication Data
US 2022/0094455 A1    Mar. 24, 2022

(51) Int. Cl.
| | | |
|---|---|---|
| H04B 17/364 | (2015.01) | |
| H04W 74/08 | (2009.01) | |
| H04J 13/00 | (2011.01) | |
| H04B 17/10 | (2015.01) | |

(52) U.S. Cl.
CPC ......... *H04B 17/364* (2015.01); *H04B 17/104* (2015.01); *H04J 13/0062* (2013.01); *H04W 74/0833* (2013.01)

(58) Field of Classification Search
CPC . H04B 17/364; H04B 17/104; H04J 13/0062; H04W 74/0833
See application file for complete search history.

(56) References Cited

U.S. PATENT DOCUMENTS

| | | | |
|---|---|---|---|
| 2004/0057543 A1* | 3/2004 | Huijgen | H04J 3/0682 375/356 |
| 2004/0152421 A1 | 8/2004 | Erlenbach et al. | |
| 2007/0147562 A1 | 6/2007 | Eidson | |
| 2009/0046586 A1* | 2/2009 | Stuart | H04J 3/0682 370/236 |
| 2011/0286361 A1 | 11/2011 | Li et al. | |
| 2012/0163299 A1* | 6/2012 | Chen | H04W 56/004 370/328 |
| 2012/0263220 A1 | 10/2012 | Li et al. | |
| 2013/0279507 A1* | 10/2013 | Miyabe | H04L 45/74 370/392 |
| 2013/0322872 A1 | 12/2013 | Le Rouzic et al. | |

(Continued)

*Primary Examiner* — Edan Orgad
*Assistant Examiner* — Malick A Sohrab
(74) *Attorney, Agent, or Firm* — C. Keith Montgomery

(57) ABSTRACT

Measuring an end-to-end delay(s) in a distributed communications system (DCS) is disclosed. The DCS is coupled to a signal source(s) supporting multiple logical channels and includes multiple remote units each communicating in one or more of the logical channels. The DCS is configured to measure an end-to-end delay(s), which includes a path delay(s) between the signal source and the remote units and a local delay(s) at each of the remote units, for each of the logical channels. The measured end-to-end delay(s) can help the signal source to more accurately determine an equivalent coverage range of the DCS, thus making it possible to generate random access preambles for the DCS based on as few Zadoff-Chu (ZC) sequences as possible. By generating the random access preambles based on fewer ZC sequences, it is possible to minimize interference among the random access preambles, thus helping to improve random access performance in the DCS.

20 Claims, 12 Drawing Sheets

(56) References Cited

U.S. PATENT DOCUMENTS

| | | | |
|---|---|---|---|
| 2014/0050482 A1* | 2/2014 | Berlin | H04B 10/25758 |
| | | | 398/115 |
| 2014/0270754 A1* | 9/2014 | Loehr | H04B 10/0795 |
| | | | 398/25 |
| 2015/0098351 A1 | 4/2015 | Zavadsky et al. | |
| 2016/0065320 A1 | 3/2016 | Berlin et al. | |
| 2016/0088581 A1 | 3/2016 | Lorenz et al. | |
| 2017/0180070 A1 | 6/2017 | Ruffini et al. | |
| 2017/0208622 A1* | 7/2017 | Mizrahi | H04W 74/002 |
| 2017/0264556 A1* | 9/2017 | Varga | H04L 47/41 |
| 2017/0289827 A1* | 10/2017 | Harel | H04B 17/364 |
| 2017/0367061 A1* | 12/2017 | Kim | H04L 7/0041 |
| 2018/0049147 A1* | 2/2018 | Chen | H04W 56/0015 |
| 2018/0069801 A1* | 3/2018 | Qi | H04L 43/16 |

* cited by examiner

| ZERO CORRELATION ZONE HIGH SPEED FLAG=FALSE INDEX | CYCLIC SHIFT | PREAMBLE SEQUENCES PER ROOT SEQUENCE | ROOT SEQUENCES REQUIRED PER CELL | ROOT SEQUENCES REUSE PATTERN | CELL RANGE (km) |
|---|---|---|---|---|---|
| 1 | 13 | 64 | 1 | 838 | 0.76 |
| 2 | 15 | 55 | 2 | 419 | 1.04 |
| 3 | 18 | 46 | 2 | 419 | 1.47 |
| 4 | 22 | 38 | 2 | 419 | 2.04 |
| 5 | 26 | 32 | 2 | 419 | 2.62 |
| 6 | 32 | 26 | 3 | 279 | 3.47 |
| 7 | 38 | 22 | 3 | 279 | 4.33 |
| 8 | 46 | 18 | 4 | 209 | 5.48 |
| 9 | 59 | 14 | 5 | 167 | 7.34 |
| 10 | 76 | 11 | 6 | 139 | 9.77 |
| 11 | 93 | 9 | 8 | 104 | 12.20 |
| 12 | 119 | 7 | 10 | 83 | 15.92 |
| 13 | 167 | 5 | 13 | 64 | 22.78 |
| 14 | 279 | 3 | 22 | 38 | 38.80 |
| 15 | 419 | 2 | 32 | 26 | 58.83 |
| 0 | 838 | 1 | 64 | 13 | 118.8 |

```
                                    600
                                      ↙

┌─────────────────────────────────────────────────────────────────────────┐
│ RECEIVE A PLURALITY OF MEASUREMENT WORDS (MW1, MW2, MW3) EACH CORRESPONDING TO │
│       A RESPECTIVE ONE OF A PLURALITY OF LOGICAL CHANNELS (CH1, CH2, CH3)      │
│                                   602                                          │
└─────────────────────────────────────────────────────────────────────────┘
                                      ↓
┌─────────────────────────────────────────────────────────────────────────┐
│  ROUTE, TO EACH OF A PLURALITY OF REMOTE UNITS (408(1)-408(N)), ONE OR MORE OF THE │
│  PLURALITY OF MEASUREMENT WORDS (MW1, MW2, MW3) CORRESPONDING TO ONE OR MORE       │
│   OF THE PLURALITY OF LOGICAL CHANNELS (CH1, CH2, CH3) SUPPORTED BY THE EACH OF THE │
│                    PLURALITY OF REMOTE UNITS (408(1)-408(N))                        │
│                                   604                                               │
└─────────────────────────────────────────────────────────────────────────┘
                                      ↓
┌─────────────────────────────────────────────────────────────────────────┐
│   RECEIVE THE ONE OR MORE OF THE PLURALITY OF MEASUREMENT WORDS (MW1, MW2, MW3)  │
│           UPDATED BY EACH OF THE PLURALITY OF REMOTE UNITS (408(1)-408(N))       │
│                                   606                                             │
└─────────────────────────────────────────────────────────────────────────┘
                                      ↓
┌─────────────────────────────────────────────────────────────────────────┐
│  DETERMINE AN END-TO-END DELAY ASSOCIATED WITH EACH OF THE PLURALITY OF LOGICAL   │
│  CHANNELS (CH1, CH2, CH3) BASED ON THE ONE OR MORE OF THE PLURALITY OF MEASUREMENT│
│    WORDS (MW1, MW2, MW3) RECEIVED FROM EACH OF THE PLURALITY OF REMOTE UNITS (408(1)- │
│                                   408(N))                                          │
│                                   608                                              │
└─────────────────────────────────────────────────────────────────────────┘
```

FIG. 6

MEASURING AN END-TO-END DELAY(S) IN A DISTRIBUTED COMMUNICATIONS SYSTEM

BACKGROUND

The disclosure relates generally to measuring an end-to-end delay(s) (e.g., between a signal source and a number of remote units) in a distributed communications system (DCS) to help determine a cyclic shift for generating random access preambles.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Communications systems have been provided to transmit and/or distribute communications signals to wireless devices called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a DCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on downlink communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the DCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective downlink communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous signal beams ("beams") 120(1)-120(N) for the communications signal streams 108(1)-108(S) to serve multiple wireless client devices 106(1)-106(W). For example, the multiple beams 120(1)-120(N) may support multiple-input, multiple-output (MIMO) communications.

The radio node 102 of the DCS 100 in FIG. 1 may be configured to support service providers 104(1)-104(N) that have a different frequency spectrum and do not share the spectrum. Thus in this instance, the downlink communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e. shared) between the multiple service providers 104(1)-104(N) for providing services to the subscribers.

The radio node 102 in FIG. 1 can also be coupled to a distributed communications system, such as a distributed antenna system (DAS), such that the radio circuits 118(1)-118(N) remotely distribute the downlink communications signals 110(1)-110(N) of the multiple service providers 104(1)-104(N) to remote units. The remote units each include an antenna that may be similar to the antenna 112 in FIG. 1 for radiating the downlink communications signals 110(1)-110(N) to subscribers. Notably, each of the remote units may be configured to communicate the downlink communications signals 110(1)-110(N) in one or more frequency bands. In addition, each of the remote units may also be configured to receive uplink communications signals in one or more frequency bands.

Before any of the wireless client devices 106(1)-106(W) can communicate any of the communications signal streams 108(1)-108(S) with any of the radio circuits 118(1)-118(N), the wireless client device must transmit a preamble via a Physical Random Access Channel (PRACH) to request a connection to the radio circuits 118(1)-118(N). The wireless client devices 106(1)-106(W) may be configured to share a pool (e.g., 64) of preambles generated based on a root sequence(s), also known as a Zadoff-Chu (ZC) sequence(s). The preambles may be created by equally spaced cyclic shifts of the root sequence(s). Notably, a cyclic shift can be configured with different lengths (in terms of number of symbols) to accommodate for different signal propagation delays in a wireless communications cell. For example, the length of the cyclic shift can be determined based on the signal propagation delay between the antenna 112 and an edge of the wireless communications cell. In this regard, the larger the radius of the wireless communications cell is, the longer the cyclic shift needs to be. Understandably, as the length of the cyclic shift increases, the number of preambles that can be created from a root sequence will decrease. As a result, more root sequences may be needed to support a larger wireless communications cell.

No admission is made that any reference cited herein constitutes prior art. Applicant expressly reserves the right to challenge the accuracy and pertinency of any cited documents.

SUMMARY

Embodiments disclosed herein include measuring an end-to-end delay(s) in a distributed communications system (DCS). The DCS is coupled to a signal source(s) that supports multiple logical channels. The DCS includes a number of remote units each configured to communicate in a coverage cell in one or more of the logical channels. The DCS is configured to measure an end-to-end delay(s), which includes a path delay(s) between the signal source and the remote units and a local delay(s) at each of the remote units, for each of the logical channels. The measured end-to-end delay(s) can help the signal source to more accurately determine an equivalent coverage range of the DCS, thus making it possible to generate random access preambles for the DCS based on as few Zadoff-Chu (ZC) sequences as possible. By generating the random access preambles based on fewer ZC sequences, it is possible to minimize interference among the random access preambles, thus helping to improve random access performance in the DCS.

One exemplary embodiment of the disclosure relates to a DCS. The DCS includes a routing circuit coupled to a signal source associated with a plurality of logical channels. The DCS also includes a plurality of remote units coupled to the routing circuit and each configured to communicate an RF communications signal in one or more of the plurality of logical channels in a coverage cell. The routing circuit is configured to receive a plurality of delay measurement words each corresponding to a respective one of the plurality of logical channels. The routing circuit is also configured to route, to each of the plurality of remote units, one or more of the plurality of delay measurement words corresponding to the one or more of the plurality of logical channels communicated by the each of the plurality of remote units. The routing circuit is also configured to receive the one or more of the plurality of delay measurement words updated by each of the plurality of remote units. The routing circuit is also configured to determine an end-to-end delay associated with each of the plurality of logical channels based on the one or more of the plurality of delay measurement words received from each of the plurality of remote units.

An additional exemplary embodiment of the disclosure relates to a method for measuring an end-to-end delay(s) in a DCS. The method includes receiving a plurality of delay measurement words each corresponding to a respective one of a plurality of logical channels. The method also includes routing, to each of a plurality of remote units, one or more of the plurality of delay measurement words corresponding to one or more of the plurality of logical channels communicated by the each of the plurality of remote units. The method also includes receiving the one or more of the plurality of delay measurement words updated by each of the plurality of remote units. The method also includes determining an end-to-end delay associated with each of the plurality of logical channels based on the one or more of the plurality of delay measurement words received from each of the plurality of remote units.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6 is a flowchart of an exemplary process for measuring the end-to-end delay(s) in the DCS of FIG. 4;

DETAILED DESCRIPTION

Embodiments disclosed herein include measuring an end-to-end delay(s) in a distributed communications system (DCS). The DCS is coupled to a signal source(s) that supports multiple logical channels. The DCS includes a number of remote units each configured to communicate in a coverage cell in one or more of the logical channels. The DCS is configured to measure an end-to-end delay(s), which includes a path delay(s) between the signal source and the remote units and a local delay(s) at each of the remote units, for each of the logical channels. The measured end-to-end delay(s) can help the signal source to more accurately determine an equivalent coverage range of the DCS, thus making it possible to generate random access preambles for the DCS based on as fewer Zadoff-Chu (ZC) sequence as possible. By generating the random access preambles based on fewer ZC sequences, it is possible to minimize interference among the random access preambles, thus helping to improve random access performance in the DCS.

Figure 1:
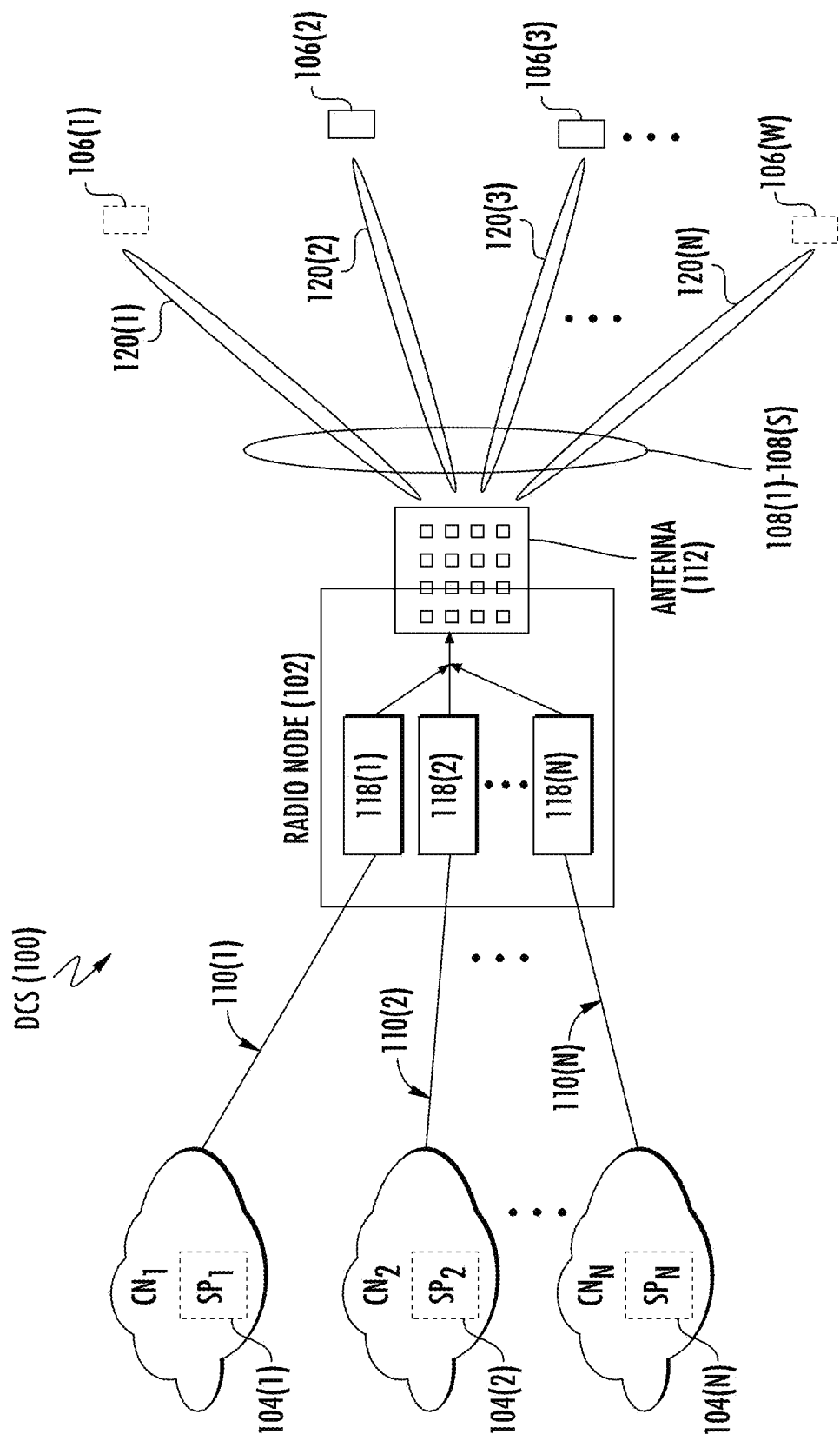
FIG. 1 is a schematic diagram of an exemplary distributed communications system (DCS) that includes a conventional single operator radio node configured to support distribution of communications signals for multiple service providers.
Figure 2:
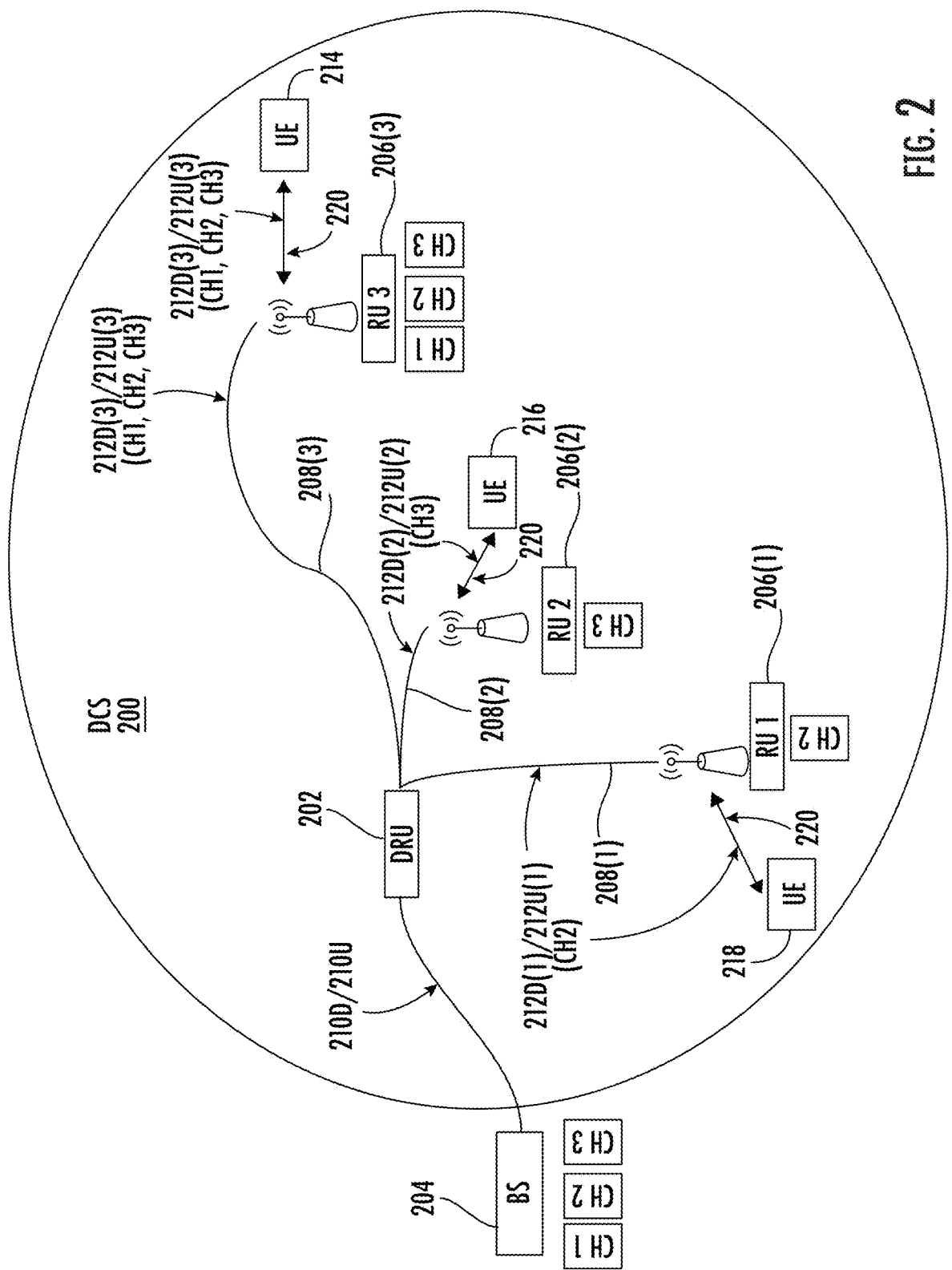
FIG. 2 is schematic diagram of an exemplary conventional DCS configured to determine a cyclic shift for generating random access preambles based on a conventional method.
Figures 3A, 3B:
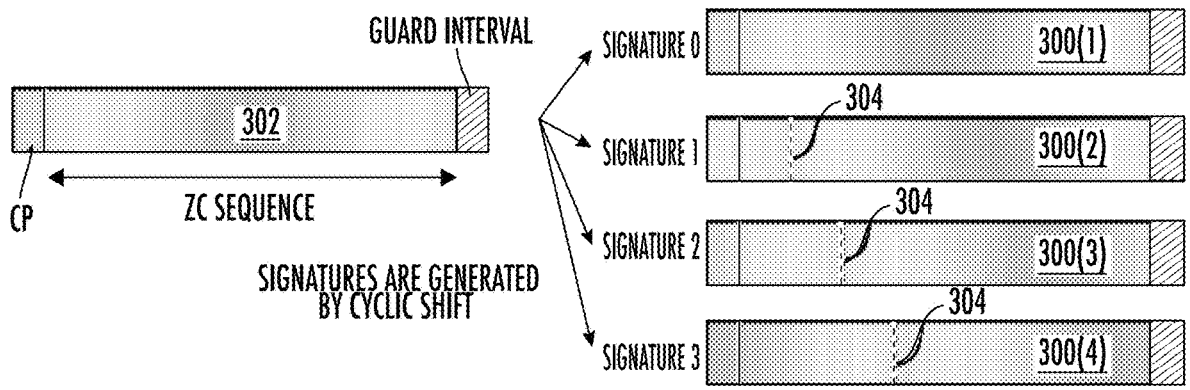
FIG. 3A is a block diagram providing an exemplary illustration of a number of random access (RA) preambles generated based on a Zadoff-Chu (ZC) sequence.
FIG. 3B is a table providing an exemplary illustration of how many RA preambles are required to cover a specific cell range of a wireless communications cell.
Figure 4:
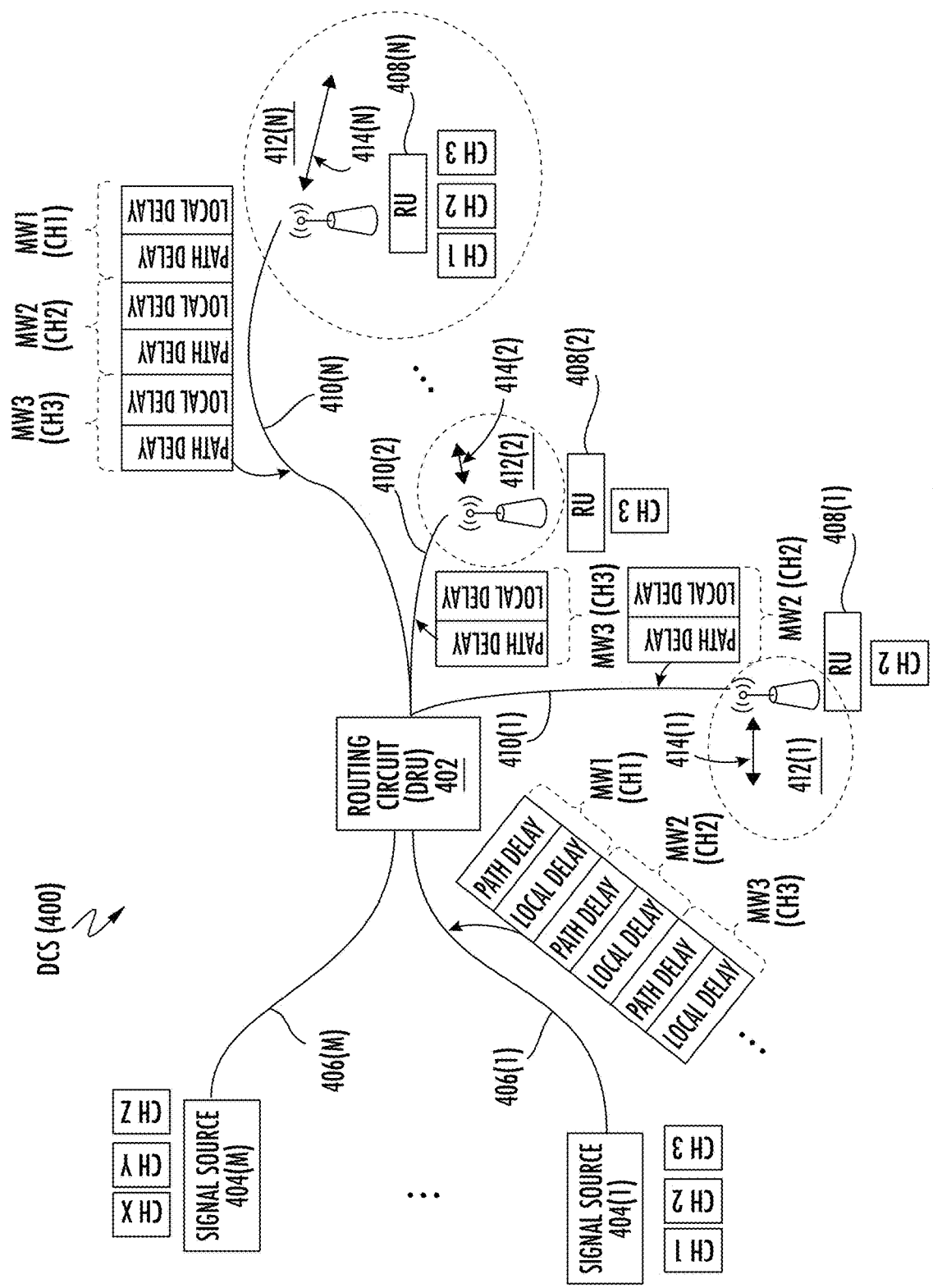
FIG. 4 is a schematic diagram of an exemplary DCS configured to measure an end-to-end delay(s) to help improve random access performance in the DCS.

Before discussing measuring an end-to-end delay(s) in a DCS according to the present disclosure, starting at FIG. 4, an overview of a conventional method for determining a cyclic shift for generating random access preambles in a conventional DCS is first provided with reference to FIGS. 2, 3A, and 3B.

In this regard, FIG. 2 is schematic diagram of an exemplary conventional DCS 200 configured to determine a cyclic shift for generating random access preambles based on a conventional method. The conventional DCS 200 includes a digital routing unit (DRU) 202 coupled to a base station (BS) 204. The DRU 202 is also coupled to a plurality of remote units 206(1)-206(3) via a plurality of optical fiber-based communications mediums 208(1)-208(3), respectively. Although the conventional DCS 200 is shown to include only three remote units 206(1)-206(3), it should be appreciated that the conventional DCS 200 can include additional remote units.

In a non-limiting example, the BS 204 is associated with a plurality of logical channels CH1, CH2, and CH3. Herein, a logical channel is a logical representation of a specific clusterization as predetermined by an operator for a given WCS deployment. It should be appreciated that the BS 204 can also be associated with additional logical channels.

Each of the remote units 206(1)-206(3) is configured to support one or more of the logical channels CH1, CH2, and CH3. For example, the remote unit 206(1) is configured to support the logical channel CH2, the remote unit 206(2) is configured to support the logical channel CH3, and the remote unit 206(3) is configured to support all of the logical channels CH1, CH2, and CH3.

The DRU 202 communicates a combined downlink communications signal 210D and a combined uplink communications signal 210U, each includes the logical channels CH1, CH2, and CH3, with the BS 204. Accordingly, the DRU 202 provides a plurality of downlink communications signals 212D(1)-212D(3) to the remote units 206(1)-206(3), respectively. The DRU 202 also receives a plurality of uplink communications signals 212U(1)-212U(3) from the remote units 206(1)-206(3) and generates the combined uplink communications signal 210U accordingly. In a non-limiting example, each of the downlink communications signals 212(1)-212(3) includes the logical channels a respective one of the remote units 206(1)-206(3) is configured to support. Specifically, the downlink communications signal 212(1) includes the logical channel CH2 the remote unit 206(1) is configured to support, the downlink communications signal 212(2) includes the logical channel CH3 the remote unit 206(2) is configured to support, and the downlink communications signal 212(3) includes the logical channels CH1, CH2, and CH3 the remote unit 206(3) is configured to support.

In a non-limiting example, the optical fiber-based communications medium 210(3) is longer than the optical fiber-based communications medium 210(1), and the optical fiber-based communications medium 210(1) is longer than the optical fiber-based communications medium 210(2). In this regard, the downlink communications signal 212(3) will experience a longer path delay than the downlink communications signal 212(1), and the downlink communications signal 212(1) will experience a longer path delay than the downlink communications signal 212(2). In addition, the remote unit 206(3) has a weaker processing capability (e.g., slower processor, lesser memory, etc.) or involves more processing steps (e.g., digital pre-distortion) than the remote units 206(1) and 206(2). Furthermore, the remote unit 206(3) may only be capable of transmitting in a lower power than the remote units 206(1) and 206(2). As a result, a user equipment (UE) 214 connected to the remote unit 206(3) will experience a longer delay in receiving the downlink communications signal 212(3) compared to another UE 216 connected to the remote unit 206(2) and a UE 218 connected to the remote unit 206(1), even if the remote unit 206(3) and the remote unit 206(1) are communicating in a same RF channel.

Before any of the UEs 214, 216, 218 can receive any of the downlink communications signals 212(1)-212(3), which includes non-broadcast (e.g., unicast and multicast) user data, the UEs 214, 216, 218 must transmit a random access (RA) preamble 220 (also known as "signature") over a Physical Random Access Channel (PRACH) to request a connection(s) to the BS 204. As previously discussed, the UEs 214, 216, 218 may be configured to share a pool (e.g., 64) of RA preambles generated based on a root sequence(s), also known as a ZC sequence(s). In this regard, FIG. 3A is a block diagram providing an exemplary illustration of a number of RA preambles 300(1)-300(4) (denoted as "Signature 0," "Signature 1," "Signature 2," and "Signature 3," respectively) generated based on a ZC sequence 302.

As shown in FIG. 3A, the RA preambles 300(1)-300(4) may be created by equally spacing the cyclic shifts 304 of the ZC sequence 302. According to a Third-Generation Partnership Project (3GPP) definition, the ZC sequence 302 has a respective length of 839 symbols and can allow up to 838 of the cyclic shifts 304.

The cyclic shifts 304 can be configured with different lengths (in terms of number of symbols) to accommodate for different signal propagation delays in a wireless communications cell. Typically, the cyclic shifts 304 are determined based on a maximum signal propagation delay (e.g., between a transmitting antenna and a cell edge) in the wireless communications cell. Accordingly, the length of the cyclic shifts 304 can be determined based on a cell range of the wireless communications cell.

In this regard, FIG. 3B is a table 306 providing an exemplary illustration on how many RA preambles are required to cover a specific cell range of a wireless communications cell. According to row #1 of the table 306, the BS 204 can choose Index #1 if the wireless communications cell has a cell range up to 0.76 kilometers (km). Accordingly, only one (1) ZC sequence is needed to create 64 RA preambles. According to row #2 of the table 306, the BS 204 needs to choose Index #2 if the wireless communications cell has a cell range up to 1.04. Accordingly, two (2) ZC sequences are needed to create 55 RA preambles. Table 306 indicates that, as cell range of the wireless communications cell increases, more ZC sequences would be needed to generate the RA preambles for providing random access in the wireless communications cell.

With reference back to FIG. 2, the BS 204 may treat the entire conventional DCS 200 as a wireless communications cell. Notably, the combined downlink communications signal 210 may experience both path and processing delays in the conventional DCS 200 when propagating from the BS 204 to each of the remote units 206(1)-206(3). The BS 204, on the other hand, is not aware of the path and processing delays incurring in the conventional DCS 200. As such, the BS 204 needs to treat the conventional DCS 200 as a wireless communications cell with an arbitrary cell range large enough to accommodate the unknown path and processing delays. As a result, the BS 204 may use more than one ZC sequences to generate the RA preambles for providing random access to the UEs 214, 216, 218.

However, the RA preambles obtained from more than one ZC sequence may not be strictly orthogonal, thus causing interferences among these RA preambles to potentially compromise random access procedures performed by the UEs 214, 216, 218. Thus, it may be desirable to accurately measure the path and processing delays in the conventional DCS 200 such that the BS 204 can generate the RA preambles, preferably, based on a single ZC sequence.

In this regard, FIG. 4 is a schematic diagram of an exemplary DCS 400 configured to measure an end-to-end delay(s) to help improve random access performance in the DCS 400. The DCS includes a routing circuit 402 (e.g., a DRU) coupled to one or more signal sources 404(1)-404(M) (e.g., BS or baseband unit) via a plurality of electrical communications mediums 406(1)-406(M) (e.g., coaxial cables or twisted pair cables). The signal sources 404(1)-404(M) may be included in or excluded from the DCS 400. Herein, the routing circuit 402 can be an integrated circuit (IC) or a system-on-chip (SoC) having signal processing, signal combining/splitting, signal routing, and/or signal conversion capabilities. The routing circuit 402 is coupled to a plurality of remote units 408(1)-408(N) (denoted as "RU") via a plurality of optical fiber-based communications mediums 410(1)-410(N). Herein, each of the remote units 408(1)-408(N) can be an IC or an SoC having signal processing, signal conversion, signal transmitting/receiving capabilities. In this regard, each of the remote units 408(1)-408(N) is capable of transmitting/receiving RF communications signal in a respective one of a plurality of coverage cells 412(1)-412(N).

Figure 5:
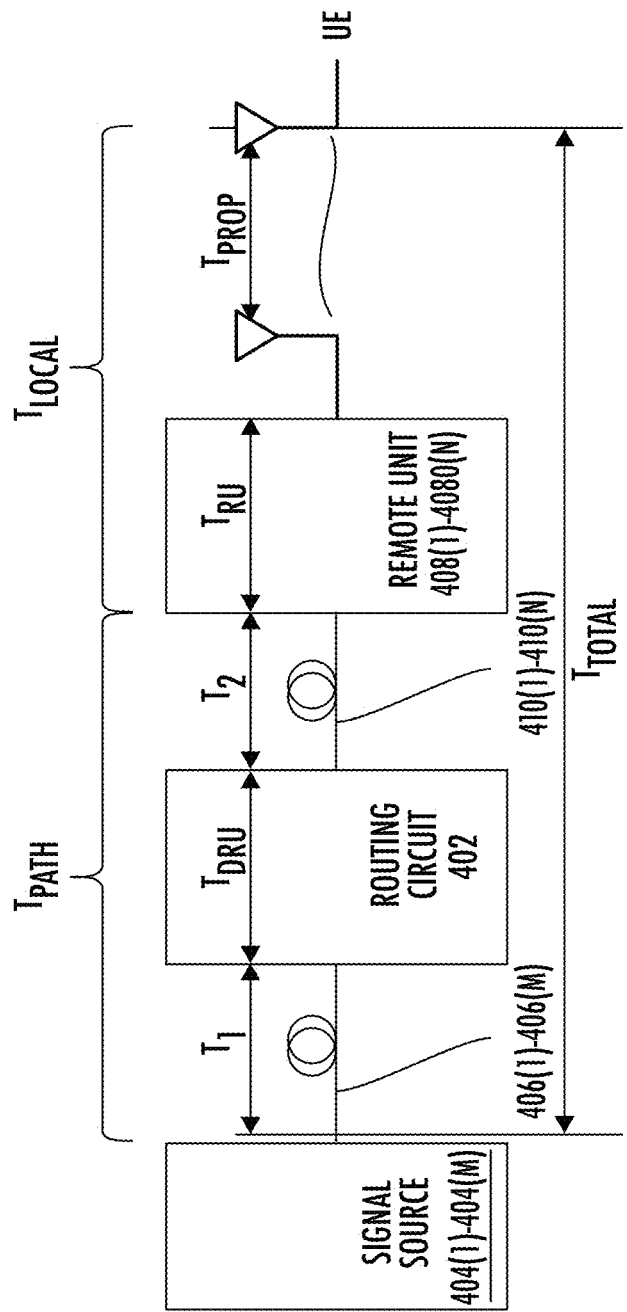
FIG. 5 is a block diagram providing an exemplary illustration of the end-to-end delay(s) being measured in the DCS of FIG. 4.

As discussed in detail below, the DCS 400 can be configured to measure an end-to-end delay $T_{Total}$ between any of the signal sources 404(1)-404(M) and any of the remote units 408(1)-408(N). In a non-limiting example, as illustrated in FIG. 5, the measured end-to-end delay $T_{Total}$ can include both path delay and processing delays. FIG. 5 is a block diagram providing an exemplary illustration of the end-to-end delay $T_{Total}$ being measured in the DCS 400 of FIG. 4. Common elements between FIGS. 4 and 5 are shown therein with common element numbers and will not be re-described herein.

In a non-limiting example, the end-to-end delay $T_{Total}$ includes both a path delay $T_{PATH}$ from any of the signal sources 404(1)-404(M) to any of the remote units 408(1)-408(N) and a local delay $T_{LOCAL}$ related to any of the remote units 408(1)-408(N) ($T_{Total}=T_{PATH}+T_{LOCAL}$). Specifically, the path delay $T_{PATH}$ includes a delay $T_1$ between any of the signal sources 404(1)-404(M) and the routing circuit 402 over any of the electrical communications mediums 406(1)-406(M), a delay $T_{DRU}$ inside the routing circuit 402, and a delay $T_2$ between the routing circuit 402 and any of the remote units 408(1)-408(N) over the optical fiber-based communications mediums 410(1)-410(N) ($T_{PATH}=T_1+T_{DRU}+T_2$). Notably, the second path delay $T_{DRU}$ may also include processing delays (e.g., signal combining/splitting/routing delays) incurred inside the routing circuit 402. The local delay $T_{LOCAL}$ includes a signal processing delay $T_{RU}$, which can include both digital processing delay and analog processing delay, and a signal propagation delay $T_{prop}$ associated with signal propagation from any of the remote units 408(1)-408(N) to an edge of a respective one of the coverage cells 412(1)-412(N) ($T_{LOCAL}=T_{RU}+T_{prop}$).

Understandably, the path delay $T_{PATH}$ can vary depending on respective lengths of the electrical communications mediums 406(1)-406(M) and the optical fiber-based communications mediums 410(1)-410(N). As such, the path delay $T_{PATH}$ is considered a variable delay. In contrast, the local delay $T_{LOCAL}$ is largely known to each of the remote units 408(1)-408(N) and, thus, can be considered a fixed delay. In a non-limiting example, the path delay $T_{PATH}$ can be measured based on a 260 nanoseconds (260 ns) resolution and the local delay $T_{LOCAL}$ can be measured based on a 10 ns resolution.

With reference back to FIG. 4, each of the signal sources 404(1)-404(M) can be associated with a plurality of logical channels, each of which is a logical representation of a specific type of higher layer traffic, such as a MAC layer traffic, an IP layer traffic, and so on. In a non-limiting example, the signal source 404(1) is associated with logical channels CH1, CH2, and CH3 and the signal source 404(M) is associated with logical channels CHX, CHY, CHZ It should be appreciated that any of the signal sources 404(1)-404(M) can be associated with additional logical channels. For the sake of clarity, the signal source 404(1), which is associated with the logical channels CH1, CH2, and CH3, is discussed hereinafter as a non-limiting example.

The remote units 408(1)-408(N) are configured to communicate (e.g., transmit and receive) a plurality of radio frequency (RF) communications signals 414(1)-414(N) in the coverage cells 412(1)-412(N). Each of the remote units 408(1)-408(N) can communicate a respective one of the RF communications signals 414(1)-414(N) in one or more of the logical channels CH1, CH2, and CH3 supported by the signal source 404(1). In a non-limiting example, the remote unit 408(1) is configured to communicate the RF communications signal 414(1) in the logical channel CH2 in the coverage cell 412(1), the remote unit 408(2) is configured to communicate the RF communications signal 414(2) in the logical channel CH3 in the coverage cell 412(2), and the remote unit 408(N) is configured to communicate the RF communications signal 414(N) in the logical channels CH1, CH2, and CH3 in the coverage cell 412(N). It should be appreciated that each of the remote units 408(1)-408(N) can be configured to communicate a respective one of the RF communications signals 414(1)-414(N) in any combination of the logical channels CH1, CH2, and CH3.

As discussed in detail below, the DCS 400 can be configured to measure the end-to-end delay $T_{Total}$ on each of the logical channels CH1, CH2, and CH3. Notably, more than one of the remote units 408(1)-408(N) can be configured to support an identical logical channel. For example, both the remote units 408(1) and 408(N) support the logical channel CH2 and both the remote units 408(2) and 408(N) support the logical channel CH3. As such, there may be multiple end-to-end delays $T_{Total}$ being measured for each of the logical channels CH1, CH2, and CH3. Given that the optical fiber-based communications mediums 410(1)-410(N) can be of different lengths and each of the remote units 408(1)-408(N) can be in different types (e.g., high-power, mid-power, or low-power) and/or have different processing capabilities (e.g., in terms of number and speed of signal processors and amount of memories), the multiple end-to-end delays $T_{Total}$ measured for a same logical channel can be different. In this regard, the routing circuit 402 is configured to determine a maximum end-to-end delay for each of the logical channels CH1, CH2, and CH3. Based on the measured maximum end-to-end delay for each of the logical channels CH1, CH2, and CH3, the signal source 404(1) can make a more accurate determination of the cell range of the DCS 400. Accordingly, the signal source 404(1) can select the minimum possible number of ZC sequences from table 306 in FIG. 3B to create the RA preambles for the DCS 400, thus helping to minimize possible interference among the RA preambles.

In a non-limiting example, the DCS 400 may be configured to operate in a measurement mode (e.g., offline) when measuring the end-to-end delay $T_{Total}$ for each of the logical channels CH1, CH2, and CH3. Specifically, the routing circuit 402 is configured to receive from the signal source 404(1) a plurality of delay measurement words MW1, MW2, MW3 each corresponding to a respective one of the logical channels CH1, CH2, and CH3. Herein, a delay measurement word is a multi-bit (e.g., 32-bit) digital field for storing a digitized value(s). The routing circuit 402 routes, to each of the remote units 408(1)-408(N), one or more of the delay measurement words MW1, MW2, and MW3 that correspond to the respective logical channels in which a respective one of the RF communications signals 414(1)-414(N) is communicated. For example, the remote unit 408(1) is configured to communicate the RF communications signal 414(1) in the logical channel CH2. Accordingly, the routing circuit 402 provides the delay measurement word MW2 to the remote unit 408(1). Similarly, the remote unit 408(N) is configured to communicate the RF communications signal 414(N) in the logical channels CH1, CH2, and CH3. Accordingly, the routing circuit 402 provides the delay measurement word MW1, MW2, and MW3 to the remote unit 408(N).

Each of the remote units 408(1)-408(N) is configured to update each of the respective one or more of the delay measurement words MW1, MW2, and MW3 with a delay measurement corresponding to a respective one of the one or more of the logical channels CH1, CH2, and CH3 for communicating the respective one of the RF communications signals 414(1)-414(N). The routing circuit 402 receives the one or more of the delay measurement words MW1, MW2, and MW3 from each of the remote units 408(1)-408(N). Accordingly, the routing circuit 402 determines the maximum end-to-end delay for each of the logical channels CH1, CH2, and CH3 based on the delay measurement in the one or more of the delay measurement words MW1, MW2, and MW3 received from each of the remote units 408(1)-408(N). Subsequently, the routing circuit 402 may provide the maximum end-to-end delay associated with each of the logical channels CH1, CH2, and CH3 to the signal source 404(1).

The DCS 400 can be configured to measure the end-to-end delays for each of the logical channels CH1, CH2, and CH3 based on a process. In this regard, FIG. 6 is a flowchart of an exemplary process 600 for measuring end-to-end delays in the DCS 400 of FIG. 4.

According to the process 600, the routing circuit 402 receives, from the signal source 404(1), the delay measurement words MW1, MW2, and MW3 each corresponding to a respective one of the logical channels CH1, CH2, and CH3 (block 602). The routing circuit 402 routes, to each of the remote units 408(1)-408(N), one or more of the delay measurement words MW1, MW2, and MW3 that correspond to one or more of the logical channels CH1, CH2, and CH3 supported by the each of the remote units 408(1)-408(N) (block 604). The routing circuit 402 receives, from each of the remote units 408(1)-408(N), the one or more of the delay measurement words MW1, MW2, and MW3 updated by each of the remote units 408(1)-408(N) (block 606). The routing circuit 402 determines an end-to-end delay associated with each of the logical channels CH1, CH2, and CH3 based on the one of more of the delay measurement words MW1, MW2, and MW3 received from each of the remote units 408(1)-408(N) (block 608).

With reference back to FIG. 4, notably, the routing circuit 402 is coupled to the remote units 408(1)-408(N) over the optical fiber-based communications mediums 410(1)-410(N). In this regard, the routing circuit 402 should include an electrical-to-optical (E/O) converter(s) to convert the delay measurement words MW1, MW2, and MW3 to optical delay measurement words for transmission to each of the remote units 408(1)-408(N). Each of the remote units 408(1)-408(N) should include an optical-to-electrical (O/E) converter(s) to convert the optical measurements words back to the delay measurement words MW1, MW2, and MW3. Each of the remote units 408(1)-408(N) should also include an E/O converter(s) to convert the updated delay measurement words MW1, MW2, and MW3 into the optical delay measurement words for transmission to the routing circuit 402. The routing circuit 402 should include an O/E converter(s) to covert the optical delay measurement words back to the delay measurement words MW1, MW2, and MW3.

In a non-limiting example, each of the delay measurement words MW1, MW2, and MW3 can be divided to include a path delay word (denoted as "Path Delay") and a local delay word (denoted as "Local Delay"). In a non-limiting example, each of the delay measurement words MW1, MW2, and MW3 is a 32-bit digital field that is equally divided into a 16-bit path delay word and a 16-bit local delay word. The path delay word is configured to measure the path delay $T_{PATH}$ between the signal source 404(1) and a respective one of the remote units 408(1)-408(N) in a respective one of the logical channels CH1, CH2, and CH3. The local delay word is configured to measure the local delay $T_{LOCAL}$ at a respective one of the remote units 408(1)-408(N) in the respective one of the logical channels CH1, CH2, and CH3. For example, the path delay word in the delay measurement word MW1 measures the path delay $T_{PATH}$ for the logical channels CH1, the path delay word in the delay measurement word MW1 measures the path delay $T_{PATH}$ for the logical channels CH2, and the path delay word in the delay measurement word MW3 measures the path delay $T_{PATH}$ for the logical channels CH3. In a non-limiting example, the path delay word in each of the delay measurement words MW1, MW2, and MW3 can be a timer or a counter, which is initialized to an initial value (e.g., a zero value or a non-zero value) and increments continuously with 260 ns resolution. The path delay word in each of the delay measurement words MW1, MW2, and MW3 may be initialized to an identical initial value (e.g., zero value). The local delay word in each of the delay measurement words MW1, MW2, and MW3 may be initialized to a zero value, a non-zero value, or not initialized at all.

Each of the remote units 408(1)-408(N) receives, from the routing circuit 402, the respective one or more of the delay measurement words MW1, MW2, and MW3 each including the path delay word and the local delay word. For example, the remote unit 408(1) receives the delay measurement word MW2, the remote unit 408(2) receives the delay measurement word MW3, and the remote unit 408(N) receives the delay measurement words MW1, MW2, and MW3. Each of the remote units 408(1)-408(N) updates the local delay word in each of the respective one or more of the delay measurement words MW1, MW2, and MW3 to indicate a local delay $T_{LOCAL}$ associated with each of the respective one or more of the logical channels CH1, CH2, and CH3. For example, the remote unit 408(1) updates the local delay word in the delay measurement word MW2 to indicate the local delay $T_{LOCAL}$ associated with the logical channel CH2, the remote unit 408(2) updates the local delay word in the delay measurement word MW3 to indicate the local delay $T_{LOCAL}$ associated with the logical channel CH3, and the remote unit 408(N) updates the local delay word in each of the delay measurement words MW1, MW2, and MW3 to indicate the local delays $T_{LOCAL}$ associated with the logical channels CH1, CH2, and CH3. Notably, the remote units 408(1)-408(N) will not change the path delay word in any of the delay measurement words MW1, MW2, and MW3. Each of the remote units 408(1)-408(N) then provides the respective one or more of the delay measurement words MW1, MW2, and MW3 to the routing circuit 402.

The routing circuit 402 receives, from each of the remote units 408(1)-408(N), the one or more of the delay measurement words MW1, MW2, and MW3 each comprising the path delay word and the updated local delay word. As previously mentioned, more than one of the remote units 408(1)-408(N) can be configured to support an identical logical channel. As such, the routing circuit 402 may receive multiple path delay words and multiple local delay words for each of the logical channels CH1, CH2, and CH3. In this regard, the routing circuit 402 needs to determine a maximum path delay word and a maximum local delay word for each of the logical channels CH1, CH2, and CH3 before reporting to the signal source 404(1).

In one non-limiting example, the optical fiber-based communications medium 410(2) is shorter than the optical fiber-based communications medium 410(N). As such, for the logical channel CH3, the routing circuit 402 will receive a smaller path delay word from the remote unit 408(2) than from the remote unit 408(N). In this regard, the maximum path delay word for the logical channel CH3 should be the path delay word received from the remote unit 408(N).

In another non-limiting example, the coverage cell 412(2) served by the remote unit 408(2) is significantly smaller than the coverage cell 412(N) served by the remote unit 408(N). In this regard, for the logical channel CH3, the local delay word received from the remote unit 408(N) may be larger than the local delay word received from the remote unit 408(2). As such, the maximum local delay word for the logical channel CH3 should be the local delay word received from the remote unit 408(N).

After determining the maximum path delay word and the maximum local delay word for each of the logical channels CH1, CH2, and CH3, the routing circuit 402 can determine the end-to-end delays Mu' for each of the logical channels CH1, CH2, and CH3. According to the previous discussion in FIG. 5, the end-to-end delays $T_{Total}$ for each of the logical channels CH1, CH2, and CH3 equals a sum of the maximum path delay word (corresponding to a maximum path delay $T_{PATH}$) and the maximum local delay word (corresponding to a maximum local delay $T_{LOCAL}$) of the respective logical channel. The routing circuit 402 can then report to the signal source 404(1) the determined end-to-end delays Mu' for each of the logical channels CH1, CH2, and CH3. In an embodiment, the routing circuit 402 reports the determined end-to-end delays $T_{Total}$ by forwarding to the signal source 404(1) the maximum path delay word and the maximum local delay word associated with each of the logical channels CH1, CH2, and CH3. Notably, the timer in the maximum path delay word may be kept running to record path delay from the routing circuit 402 to the signal source 404(1).

In an embodiment, upon receiving the determined end-to-end delays $T_{Total}$ associated with each of the logical channels CH1, CH2, and CH3, the signal source 404(1) stops the timer in the maximum path delay word associated with each of the logical channels CH1, CH2, and CH3. The signal source 404(1) may determine a largest path delay word among the maximum path delay words associated with each of the logical channels CH1, CH2, and CH3. Likewise, the signal source 404(1) may determine a largest local delay word among the maximum local delay words associated with each of the logical channels CH1, CH2, and CH3. For example, if the maximum path delay word of the logical channel CH3 is larger than the maximum path delay words of the logical channels CH1 and CH2, the signal source 404(1) would determine the largest path delay word to be the maximum path delay word of the logical channel CH3. Similarly, if the maximum local delay word of the logical channel CH2 is larger than the maximum local delay words of the logical channels CH1 and CH3, the signal source 404(1) would determine the largest local delay word to be the maximum local delay word of the logical channel CH2.

The signal source 404(1) may then determine the end-to-end delay $T_{Total}$ for the DCS 400 as being a sum of the largest path delay word and the largest local delay word across all the logical channels CH1, CH2, and CH3. The signal source 404(1) can then determine an equivalent cell radius of the DCS 400 based on the determined end-to-end delay $T_{Total}$ in the DCS 400. In a non-limiting example, the signal source 404(1) equates the entire DCS 400 with a special coverage cell and the equivalent cell radius refers to a coverage range of the special coverage cell corresponding to the end-to-end delay $T_{Total}$. Accordingly, the signal source 404(1) can determine a number of ZC sequences (e.g., from the table 306 in FIG. 3B) required for generating random access preambles in the DCS 400 based on the determined equivalent cell radius.

Figure 7:
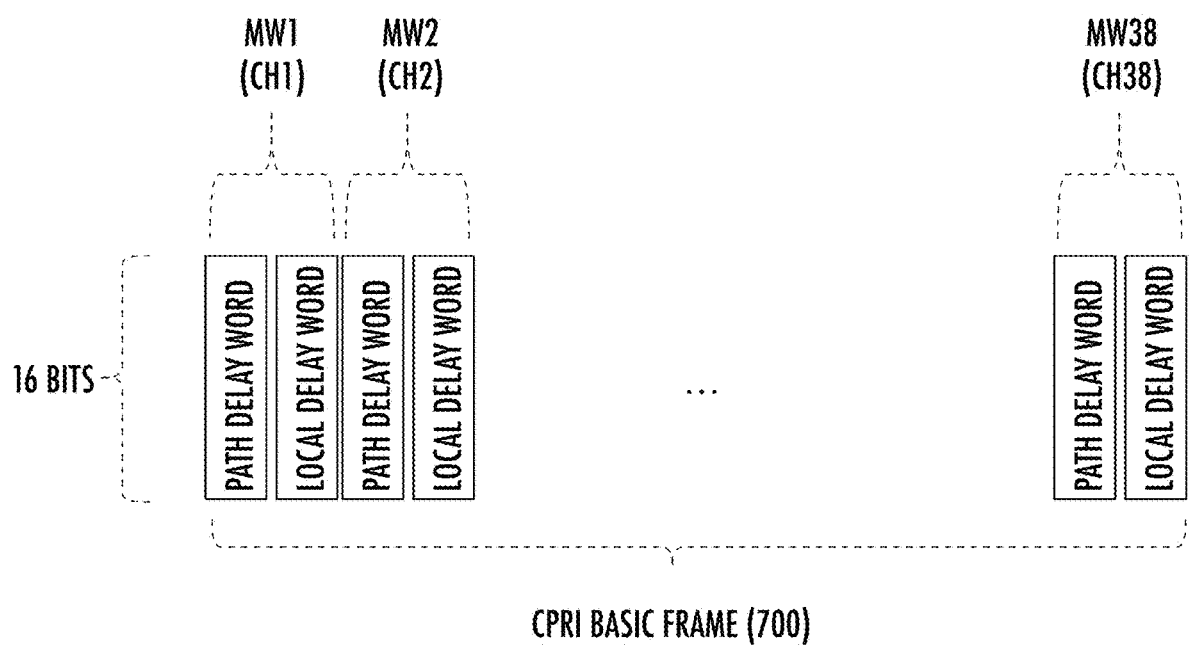
FIG. 7 is a block diagram of an exemplary Common Public Radio Interface (CPRI) basic frame for enabling end-to-end delay measurement in the DCS of FIG. 4.

In a non-limiting example, the signal source 404(1) can be a digital baseband unit (BBU) and the routing circuit 402 can be coupled to the signal source 404(1) via a Common Public Radio Interface (CPRI). Accordingly, the routing circuit 402 may receive the delay measurement words MW1, MW2, and MW3 in one or more CPRI basic frames. In this regard, FIG. 7 is a block diagram of an exemplary CPRI basic frame 700 configured to carry the delay measurement words MW1, MW2, and MW3 between the signal source 404(1) and the routing circuit 402 in the DCS 400 of FIG. 4.

In a non-limiting example, the CPRI basic frame 700 is communicated between the signal source 404(1) and the routing circuit 402 based on a 10.1 Gbps CPRI line rate. Accordingly, the CPRI basic frame 700 corresponds to a duration of 260 ns and can thus carry up to 38 delay measurement words MW1-MW38, each comprising a 16-bit path delay word and a 16-bit local delay word. In this regard, the CPRI basic frame 700 can be used to measure the path delay $T_{PATH}$ and the local delay $T_{LOCAL}$ for up to 38 logical channels CH1-CH38.

Figure 8:
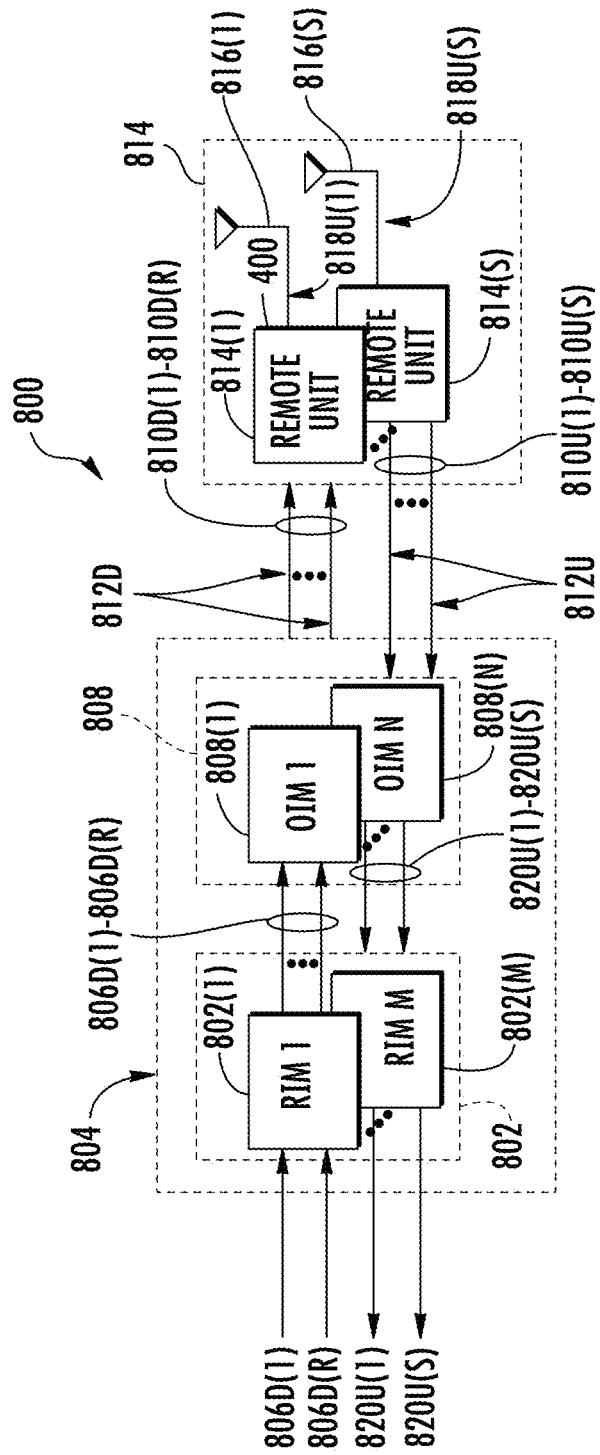
FIG. 8 is a schematic diagram of an exemplary WCS provided in the form of an optical fiber-based DAS that is configured to include the DCS of FIG. 4.

FIG. 8 is a schematic diagram of an exemplary WCS 800 provided in the form of an optical fiber-based WCS that can include the DCS 400 of FIG. 4. The WCS 800 includes an optical fiber for distributing communications services for multiple frequency bands. The WCS 800 in this example is comprised of three (3) main components. A plurality of radio interfaces provided in the form of radio interface modules (RIMs) 802(1)-802(M) are provided in a central unit 804 to receive and process a plurality of downlink communications signals 806D(1)-806D(R) prior to optical conversion into downlink optical fiber-based communications signals. The downlink communications signals 806D(1)-806D(R) may be received from a base station as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the RIMs 802(1)-802(M) as modular components that can easily be installed and removed or replaced in the central unit 804. In one example, the central unit 804 is configured to support up to twelve (12) RIMs 802(1)-802(12). Each of the RIMs 802(1)-802(M) can be designed to support a particular type of radio source or range of radio sources (i.e., frequencies) to provide flexibility in configuring the central unit 804 and the WCS 800 to support the desired radio sources.

For example, one RIM 802 may be configured to support the Personalized Communications System (PCS) radio band. Another RIM 802 may be configured to support the 800 megahertz (MHz) radio band. In this example, by inclusion of the RIMs 802(1)-802(M), the central unit 804 could be configured to support and distribute communications signals on both PCS and LTE 700 radio bands, as an example. The RIMs 802(1)-802(M) may be provided in the central unit 804 that supports any frequency bands desired, including, but not limited to, the US Cellular band, PCS band, Advanced Wireless Service (AWS) band, 700 MHz band, Global System for Mobile Communications (GSM) 900, GSM 1800, and Universal Mobile Telecommunications System (UMTS). The RIMs 802(1)-802(M) may also be provided in the central unit 804 that supports any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 802(1)-802(M) may be provided in the central unit 804 that supports any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink communications signals 806D(1)-806D(R) are provided to a plurality of optical interfaces provided in the form of optical interface modules (OIMs) 808(1)-808(N) in this embodiment to convert the downlink communications signals 806D(1)-806D(R) into a plurality of downlink optical fiber-based communications signals 810D(1)-810D(R). The notation "1-N" indicates that any number of the referenced component 1-N may be provided. The OIMs 808(1)-808(N) may be configured to provide a plurality of optical interface components (OICs) that contain optical-to-electrical (O/E) and electrical-to-optical (E/O) converters, as will be described in more detail below. The OIMs 808(1)-808(N) support the radio bands that can be provided by the RIMs 802(1)-802(M), including the examples previously described above.

The OIMs 808(1)-808(N) each include E/O converters to convert the downlink communications signals 806D(1)-806D(R) into the downlink optical fiber-based communications signals 810D(1)-810D(R). The downlink optical fiber-based communications signals 810D(1)-810D(R) are communicated over a downlink optical fiber-based communications medium 812D to a plurality of remote units 814(1)-814(S). The notation "1-S" indicates that any number of the referenced component 1-S may be provided. Remote unit O/E converters provided in the remote units 814(1)-814(S) convert the downlink optical fiber-based communications signals 810D(1)-810D(R) back into the downlink communications signals 806D(1)-806D(R), which are then converted into a plurality of downlink RF communications signals and provided to antennas 816(1)-816(S) in the remote units 814(1)-814(S) to client devices in the reception range of the antennas 816(1)-816(S).

The remote units 814(1)-814(S) receive a plurality of uplink RF communications signals from the client devices through the antennas 816(1)-816(S). The remote units 814(1)-814(S) convert the uplink RF communications signals into a plurality of uplink communications signals 818U(1)-818U(S). Remote unit E/O converters are also provided in the remote units 814(1)-814(S) to convert the uplink communications signals 818U(1)-818U(S) into a plurality of uplink optical fiber-based communications signals 810U(1)-810U(S). The remote units 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include O/E converters that convert the received uplink optical fiber-based communications signals 810U(1)-810U(S) into a plurality of uplink communications signals 820U(1)-820U(S), which are processed by the RIMs 802(1)-802(M) and provided as the uplink communications signals 820U(1)-820U(S). The central unit 804 may provide the uplink communications signals 820U(1)-820U(S) to a base station or other communications system.

Note that the downlink optical fiber-based communications medium 812D and the uplink optical fiber-based communications medium 812U connected to each of the remote units 814(1)-814(S) may be a common optical fiber-based communications medium, wherein for example, wave division multiplexing (WDM) is employed to provide the downlink optical fiber-based communications signals 810D(1)-810D(R) and the uplink optical fiber-based communications signals 810U(1)-810U(S) on the same optical fiber-based communications medium.

Figure 9:
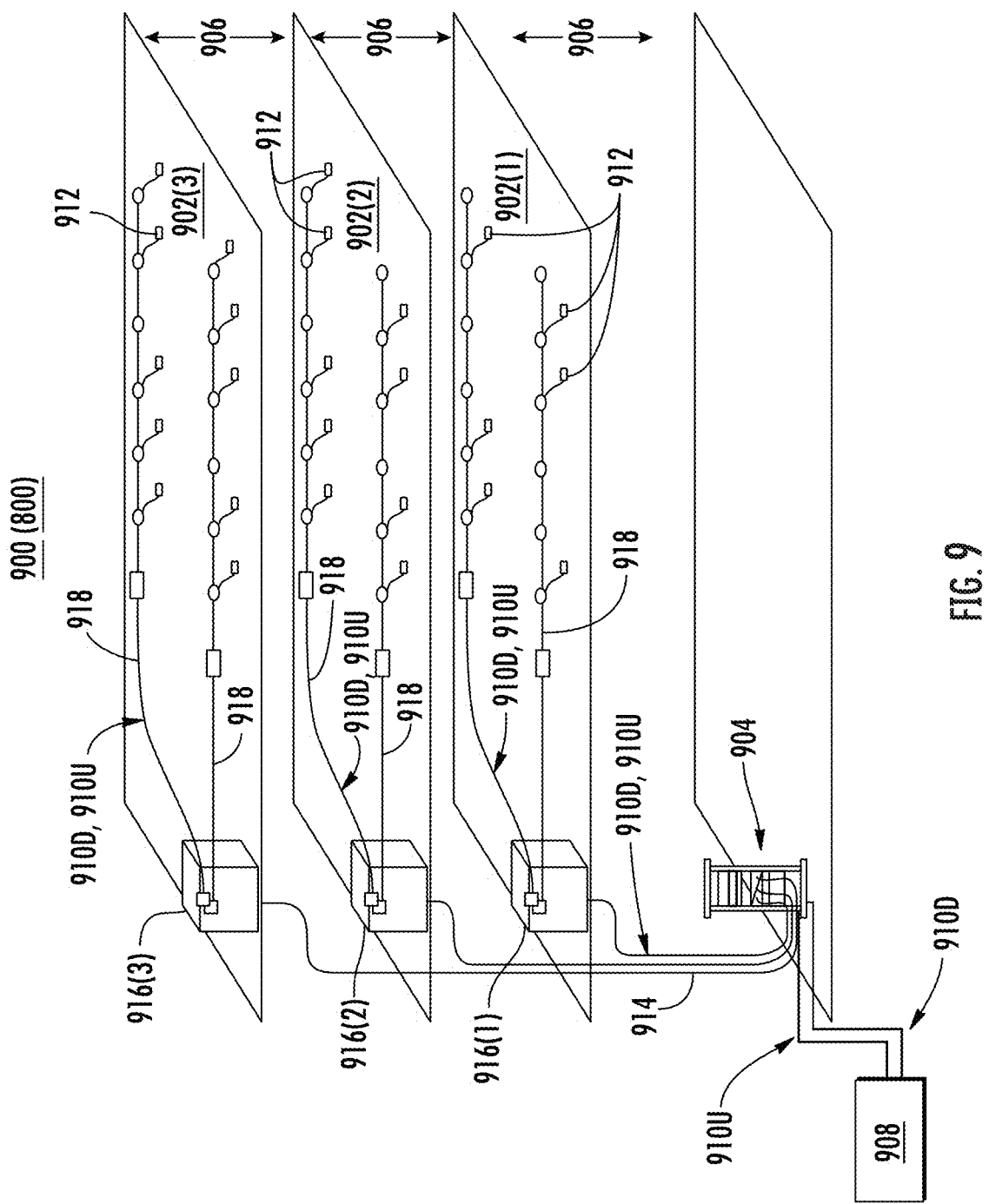
FIG. 9 is a schematic diagram of an exemplary building infrastructure with a deployed DCS, such as the optical fiber-based DAS in FIG. 8.

The WCS 800 in FIG. 8 can be provided in an indoor environment as illustrated in FIG. 9. FIG. 9 is a partial schematic cut-away diagram of an exemplary building infrastructure 900 in a WCS, such as the WCS 800 of FIG. 8. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. The downlink communications signals 910D and the uplink communications signals 910U communicated between the central unit 904 and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Figure 10:
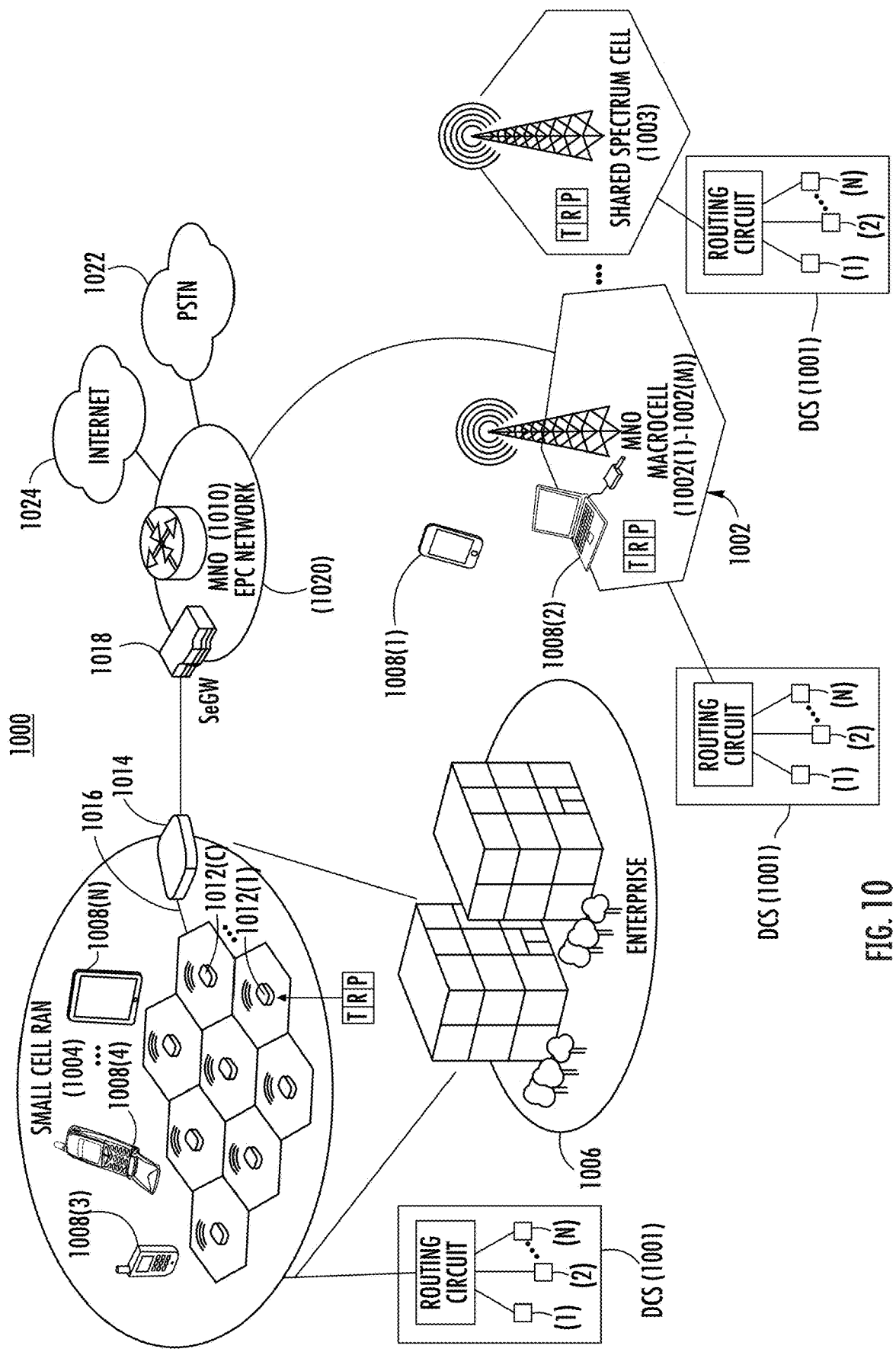
FIG. 10 is a schematic diagram of an exemplary mobile telecommunications environment that includes the DCS of FIG. 4.

The DCS 400 of FIG. 4 configured to measure an end-to-end delay(s) can also be interfaced with different types of radio nodes of service providers and/or supporting service providers, including macrocell systems, small cell systems, and remote radio heads (RRH) systems, as examples. For example, FIG. 10 is a schematic diagram of an exemplary mobile telecommunications environment 1000 (also referred to as "environment 1000") that includes radio nodes and cells that may support shared spectrum, such as unlicensed spectrum, and can be interfaced to shared spectrum DCSs 1001 supporting coordination of distribution of shared spectrum from multiple service providers to remote units to be distributed to subscriber devices. The shared spectrum DCSs 1001 can include the DCS 400 of FIG. 4 as an example.

The environment 1000 includes exemplary macrocell RANs 1002(1)-1002(M) ("macrocells 1002(1)-1002(M)") and an exemplary small cell RAN 1004 located within an enterprise environment 1006 and configured to service mobile communications between user mobile communications devices 1008(1)-1008(N) to a mobile network operator (MNO) 1010. A serving RAN for the user mobile communications devices 1008(1)-1008(N) is a RAN or cell in the RAN in which the user mobile communications devices 1008(1)-1008(N) have an established communications session with the exchange of mobile communications signals for mobile communications. Thus, a serving RAN may also be referred to herein as a serving cell. For example, the user mobile communications devices 1008(3)-1008(N) in FIG. 10 are being serviced by the small cell RAN 1004, whereas user mobile communications devices 1008(1) and 1008(2) are being serviced by the macrocell 1002. The macrocell 1002 is an MNO macrocell in this example. However, a shared spectrum RAN 1003 (also referred to as "shared spectrum cell 1003") includes a macrocell in this example and supports communications on frequencies that are not solely licensed to a particular MNO, such as CBRS for example, and thus may service user mobile communications devices 1008(1)-1008(N) independent of a particular MNO. For example, the shared spectrum cell 1003 may be operated by a third party that is not an MNO and wherein the shared spectrum cell 1003 supports CBRS. Also, as shown in FIG. 10, the MNO macrocell 1002, the shared spectrum cell 1003, and/or the small cell RAN 1004 can interface with a shared spectrum DCS 1001 supporting coordination of distribution of shared spectrum from multiple service providers to remote units to be distributed to subscriber devices. The MNO macrocell 1002, the shared spectrum cell 1003, and the small cell RAN 1004 may be neighboring radio access systems to each other, meaning that some or all can be in proximity to each other such that the user mobile communications devices 1008(3)-1008(N) may be able to be in communications range of two or more of the MNO macrocell 1002, the shared spectrum cell 1003, and the small cell RAN 1004 depending on the location of user mobile communications devices 1008(3)-1008(N).

In FIG. 10, the mobile telecommunications environment 1000 in this example is arranged as a Long Term Evolution (LTE) system as described by the 3GPP as an evolution of the GSM/UMTS standards (Global System for Mobile communication/Universal Mobile Telecommunications System). It is emphasized, however, that the aspects described herein may also be applicable to other network types and protocols. The mobile telecommunications environment 1000 includes the enterprise environment 1006 in which the small cell RAN 1004 is implemented. The small cell RAN 1004 includes a plurality of small cell radio nodes 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 10, the small cell RAN 1004 includes one or more services nodes (represented as a single services node 1014) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016 as an example, typically using secure IPsec tunnels. The small cell radio nodes 1012(1)-1012(C) can include multi-operator radio nodes. The services node 1014 aggregates voice and data traffic from the small cell radio nodes 1012(1)-1012(C) and provides connectivity over an IPsec tunnel to a security gateway (SeGW) 1018 in a network 1020 (e.g., evolved packet core (EPC) network in a 4G network, or 5G Core in a 5G network) of the MNO 1010. The network 1020 is typically configured to communicate with a public switched telephone network (PSTN) 1022 to carry circuit-switched traffic, as well as for communicating with an external packet-switched network such as the Internet 1024.

The environment 1000 also generally includes a node (e.g., eNodeB or gNodeB) base station, or "macrocell" 1002. The radio coverage area of the macrocell 1002 is typically much larger than that of a small cell where the extent of coverage often depends on the base station configuration and surrounding geography. Thus, a given user mobile communications device 1008(3)-1008(N) may achieve connectivity to the network 1020 (e.g., EPC network in a 4G network, or 5G Core in a 5G network) through either a macrocell 1002 or small cell radio node 1012(1)-1012(C) in the small cell RAN 1004 in the environment 1000.

Figure 11:
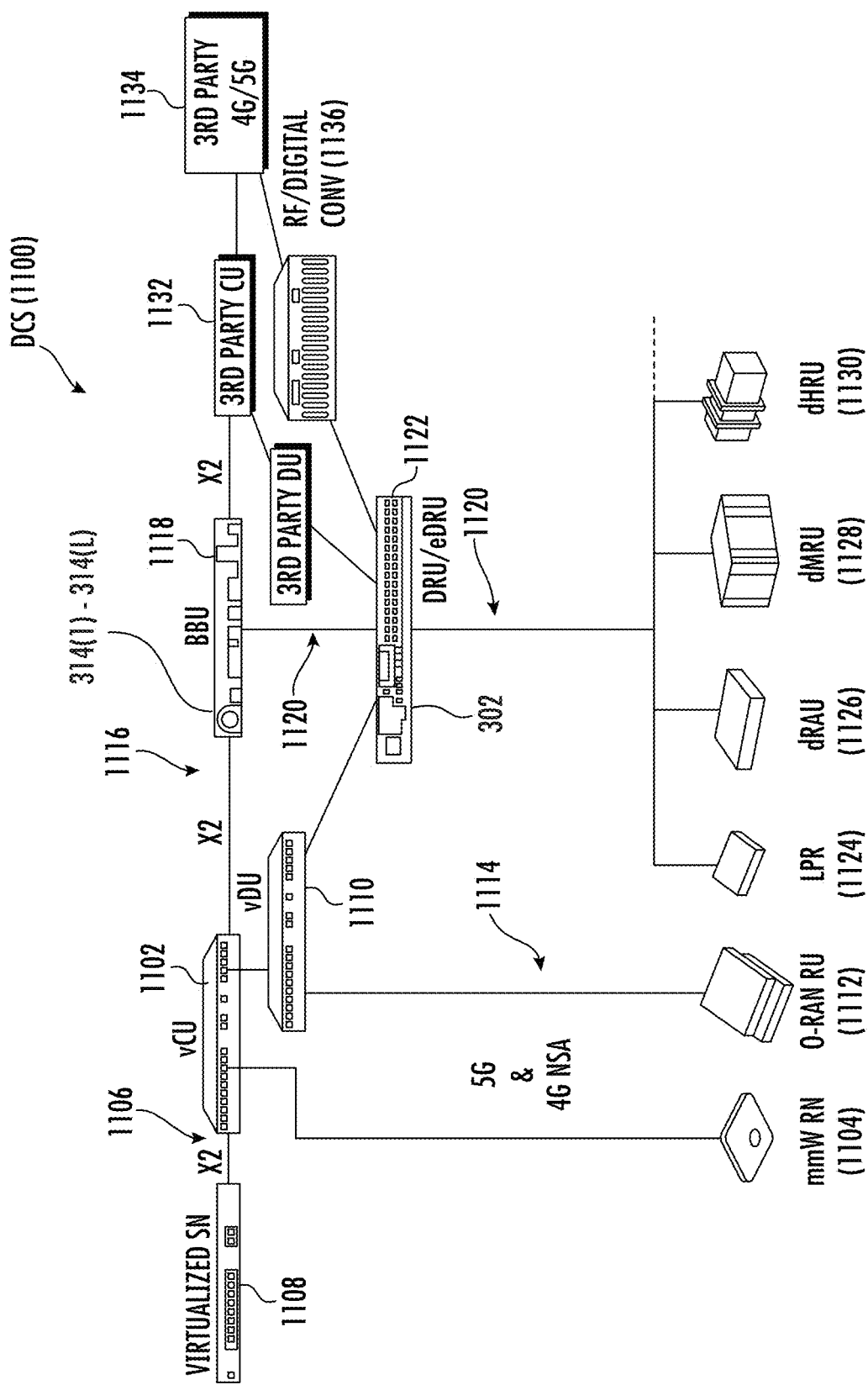
FIG. 11 is a schematic diagram of another exemplary DCS that supports 4G and 5G communications services, and wherein any of the radio nodes can be configured to support measurement of an end-to-end delay(s) according to any of the embodiments herein.

FIG. 11 is a schematic diagram of another exemplary DCS 1100 that supports 4G and 5G communications services, and wherein any of the radio nodes can be configured to support multi-signal source communications based on the O-RAN Split 7.2 configuration, according to any of the embodiments herein. The DCS 1100 supports both legacy 4G LTE, 4G/5G non-standalone (NSA), and 5G communications systems. As shown in FIG. 11, a centralized services node 1102 is provided that is configured to interface with a core network to exchange communications data and distribute the communications data as radio signals to remote units. In this example, the centralized services node 1102 is configured to support distributed communications services to a millimeter wave (mmW) radio node 1104. The functions of the centralized services node 1102 can be virtualized through an x2 interface 1106 to another services node 1108. The centralized services node 1102 can also include one or more internal radio nodes that are configured to be interfaced with a distribution node 1110 to distribute communications signals for the radio nodes to an open RAN (O-RAN) remote unit 1112 that is configured to be communicatively coupled through an O-RAN interface 1114.

The centralized services node 1102 can also be interfaced through an x2 interface 1116 to a BBU 1118 that can provide a digital signal source to the centralized services node 1102. The BBU 1118 is configured to provide a signal source to the centralized services node 1102 to provide radio source signals 1120 to the O-RAN remote unit 1112 as well as to a DRU 1122 as part of a digital DAS. The DRU 1122 is configured to split and distribute the radio source signals 1120 to different types of remote units, including a lower power remote unit (LPR) 1124, a radio antenna unit (dRAU) 1126, a mid-power remote unit (dMRU) 1128, and a high power remote unit (dHRU) 1130. The BBU 1118 is also configured to interface with a third party central unit 1132 and/or an analog source 1134 through an RF/digital converter 1136. In a non-limiting example, the DRU 1122 can be coupled to the LPR 1124, the dRAU 1126, the dMRU 1128, and the dHRU 1130.

In a non-limiting example, the BBU 1118 can be functionally equivalent to the signal sources 404(1)-404(M) in FIG. 4. The DRU 1122 can be functionally equivalent to the routing circuit 402 in FIG. 4. The LPR 1124, the dRAU 1126, the dMRU 1128, and the dHRU 1130 can be functionally equivalent to the remote units 408(1)-408(N) in FIG. 4. As such, the DCS 1100 can be configured to support measurement of an end-to-end delay(s) according to any embodiments disclosed in the present disclosure.

Figure 12:
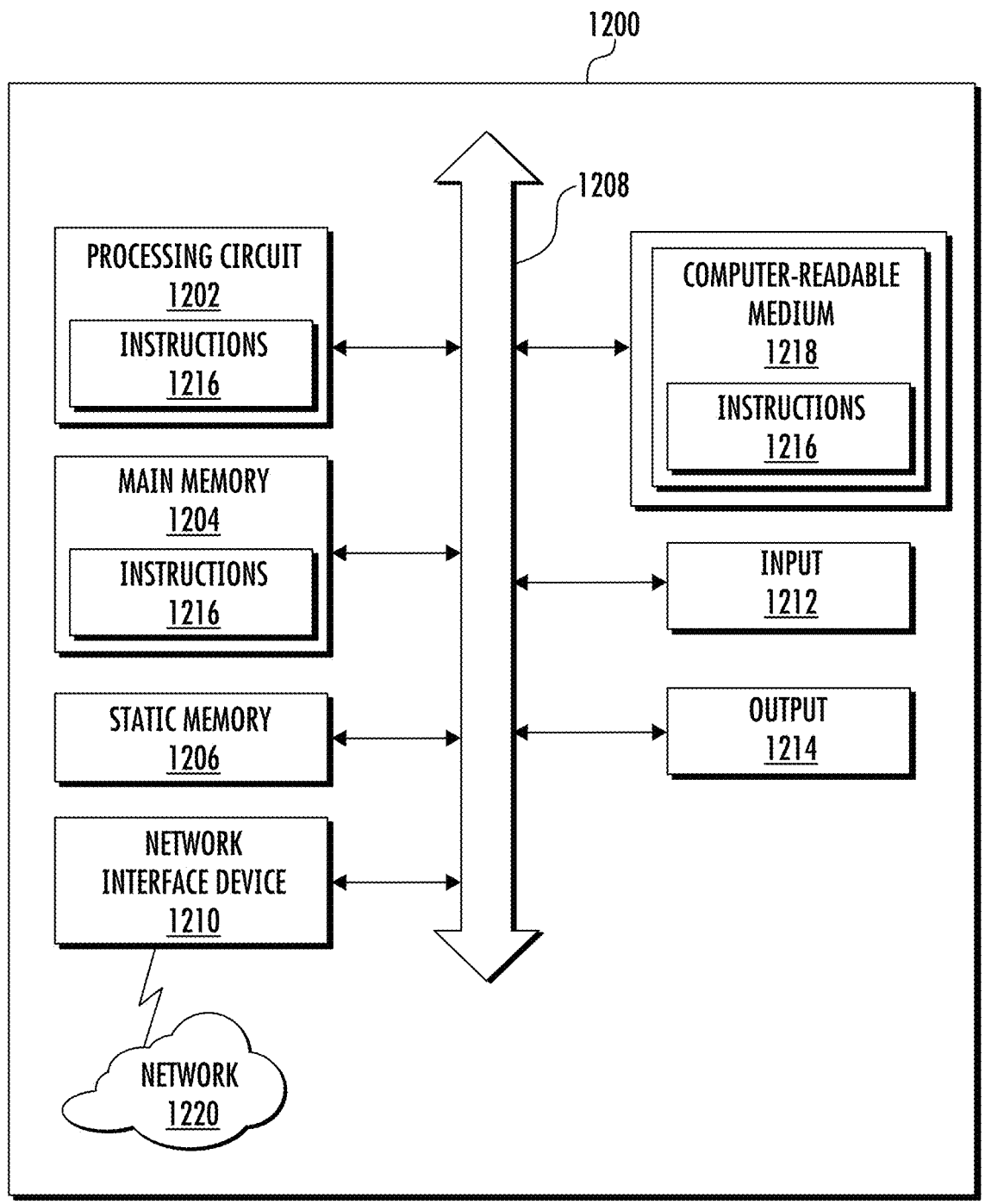
FIG. 12 is a schematic diagram of a representation of an exemplary computer system that can be included in or interface with any of the components in the DCS of FIG. 4, wherein the exemplary computer system is configured to execute instructions from an exemplary computer-readable medium.

Any of the circuits in the DCS 400 of FIG. 4 can include a computer system 1200, such as that shown in FIG. 12, to carry out their functions and operations. With reference to FIG. 12, the computer system 1200 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1200 in this embodiment includes a processing circuit or processor 1202, a main memory 1204 (e.g., read-only memory (ROM), flash memory, dynamic random access memory (DRAM) such as synchronous DRAM (SDRAM), etc.), and a static memory 1206 (e.g., flash memory, static random access memory (SRAM), etc.), which may communicate with each other via a data bus 1208. Alternatively, the processing circuit 1202 may be connected to the main memory 1204 and/or static memory 1206 directly or via some other connectivity means. The processing circuit 1202 may be a controller, and the main memory 1204 or static memory 1206 may be any type of memory.

The processing circuit 1202 represents one or more general-purpose processing circuits such as a microprocessor, central processing unit, or the like. More particularly, the processing circuit 1202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1202 is configured to execute processing logic in instructions 1216 for performing the operations and steps discussed herein.

The computer system 1200 may further include a network interface device 1210. The computer system 1200 also may or may not include an input 1212 to receive input and selections to be communicated to the computer system 1200 when executing instructions. The computer system 1200 also may or may not include an output 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processing circuit 1202 during execution thereof by the computer system 1200, the main memory 1204 and the processing circuit 1202 also constituting computer-readable medium. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A distributed communications system (DCS), comprising:
    a routing circuit coupled to a signal source associated with a plurality of logical channels; and
    a plurality of remote units coupled to the routing circuit and each configured to communicate a radio frequency (RF) communications signal in one or more of the plurality of logical channels in a coverage cell;
    wherein the routing circuit is configured to:
        receive a plurality of delay measurement words each corresponding to a respective one of the plurality of logical channels;
        route, to each of the plurality of remote units, one or more of the plurality of delay measurement words corresponding to the one or more of the plurality of logical channels communicated by the each of the plurality of remote units;
        receive the one or more of the plurality of delay measurement words updated by each of the plurality of remote units; and
        determine an end-to-end delay associated with each of the plurality of logical channels based on the one or more of the plurality of delay measurement words received from each of the plurality of remote units.

2. The DCS of claim 1, wherein the routing circuit is coupled to the signal source via a Common Public Radio Interface (CPRI) and configured to receive the plurality of delay measurement words in one or more CPRI basic frames.

3. The DCS of claim 1, wherein the plurality of delay measurement words each comprises:
    a path delay word configured to measure a path delay between the signal source and a respective one of the plurality of remote units in a respective one of the plurality of logical channels; and
    a local delay word configured to measure a local delay at the respective one of the plurality of remote units in the respective one of the plurality of logical channels.

4. The DCS of claim 3, wherein the path delay word in each of the plurality of delay measurement words comprises a timer of a determined resolution.

5. The DCS of claim 4, wherein the timer in each of the plurality of delay measurement words is initialized to an identical initial value.

6. The DCS of claim 4, wherein the plurality of remote units is each configured to:
    receive the one or more of the plurality of delay measurement words each comprising the path delay word and the local delay word;
    update the local delay word in each of the one or more of the plurality of delay measurement words to indicate the local delay associated with each of the one or more of the plurality of logical channels; and
    provide the one or more of the plurality of delay measurement words to the routing circuit.

7. The DCS of claim 6, wherein the local delay comprises:
    a respective analog processing delay associated with a respective one of the one or more of the plurality of logical channels;
    a respective digital processing delay associated with the respective one of the one or more of the plurality of logical channels; and
    a respective propagation delay in the respective one of the one or more of the plurality of logical channels.

8. The DCS of claim 6, wherein the routing circuit is further configured to:
    receive, from each of the plurality of remote units, the one or more of the plurality of delay measurement words each comprising the path delay word and the updated local delay word;
    determine a maximum path delay word for each of the plurality of logical channels among the path delay word in each of the one or more of the plurality of delay measurement words received from each of the plurality of remote units;
    determine a maximum local delay word for each of the plurality of logical channels among the updated local delay word in each of the one or more of the plurality of delay measurement words received from each of the plurality of remote units;

determine the end-to-end delay for each of the plurality of logical channels based on the maximum path delay word and the maximum local delay word associated with each of the plurality of logical channels; and provide the end-to-end delay for each of the plurality of logical channels to the signal source.

9. The DCS of claim 8, wherein the signal source is configured to:

determine a largest path delay word among the maximum path delay word associated with each of the plurality of logical channels;

determine a largest local delay word among the maximum local delay word associated with each of the plurality of logical channels;

determine the end-to-end delay as being a sum of the largest path delay word and the largest local delay word;

determine an equivalent cell radius of the DCS based on the determined end-to-end delay; and determine a number of Zadoff-Chu (ZC) sequences required for generating random access preambles in the DCS based on the determined equivalent cell radius.

10. The DCS of claim 1, further comprising the signal source coupled to the routing circuit.

11. The DCS of claim 1, wherein the routing circuit is coupled to the plurality of remote units via a plurality of optical fiber-based communications mediums.

12. A method for measuring an end-to-end delay(s) in a distributed communications system (DCS), comprising:

receiving a plurality of delay measurement words each corresponding to a respective one of a plurality of logical channels;

routing, to each of a plurality of remote units, one or more of the plurality of delay measurement words corresponding to one or more of the plurality of logical channels communicated by the each of the plurality of remote units;

receiving the one or more of the plurality of delay measurement words updated by each of the plurality of remote units; and determining an end-to-end delay associated with each of the plurality of logical channels based on the one or more of the plurality of delay measurement words received from each of the plurality of remote units.

13. The method of claim 12, further comprising receiving the plurality of delay measurement words in one or more Common Public Radio Interface (CPRI) basic frames.

14. The method of claim 12, further comprising receiving the plurality of delay measurement words each comprising:

a path delay word configured to measure a path delay between the signal source and a respective one of the plurality of remote units in a respective one of the plurality of logical channels; and a local delay word configured to measure a local delay at the respective one of the plurality of remote units in the respective one of the plurality of logical channels.

15. The method of claim 14, further comprising receiving the path delay word in each of the plurality of delay measurement words comprising a timer of a determined resolution.

16. The method of claim 15, further comprising initializing the timer in each of the plurality of delay measurement words to an identical initial value.

17. The method of claim 15, further comprising:

receiving the one or more of the plurality of delay measurement words each comprising the path delay word and the local delay word; and updating the local delay word in each of the one or more of the plurality of delay measurement words to indicate the local delay associated with each of the one or more of the plurality of logical channels.

18. The method of claim 17, further comprising updating the local delay word in each of the one or more of the plurality of delay measurement words to indicate the local delay that comprises:

a respective analog processing delay associated with a respective one of the one or more of the plurality of logical channels;

a respective digital processing delay associated with the respective one of the one or more of the plurality of logical channels; and a respective propagation delay in the respective one of the one or more of the plurality of logical channels.

19. The method of claim 17, further comprising:

receiving, from each of the plurality of remote units, the one or more of the plurality of delay measurement words each comprising the path delay word and the updated local delay word;

determining a maximum path delay word for each of the plurality of logical channels among the path delay word in each of the one or more of the plurality of delay measurement words received from each of the plurality of remote units;

determining a maximum local delay word for each of the plurality of logical channels among the updated local delay word in each of the one or more of the plurality of delay measurement words received from each of the plurality of remote units; and determining the end-to-end delay for each of the plurality of logical channels based on the maximum path delay word and the maximum local delay word associated with each of the plurality of logical channels.

20. The method of claim 19, further comprising:

determining a largest path delay word among the maximum path delay word associated with each of the plurality of logical channels;

determining a largest local delay word among the maximum local delay word associated with each of the plurality of logical channels;

determining the end-to-end delay as being a sum of the largest path delay word and the largest local delay word;

determining an equivalent cell radius of the DCS based on the determined end-to-end delay; and determining a number of Zadoff-Chu (ZC) sequences required for generating random access preambles in the DCS based on the determined equivalent cell radius.

* * * * *

UNITED STATES PATENT AND TRADEMARK OFFICE
CERTIFICATE OF CORRECTION

| | |
|---|---|
| PATENT NO. | : 11,431,425 B2 |
| APPLICATION NO. | : 17/030569 |
| DATED | : August 30, 2022 |
| INVENTOR(S) | : Shlomi Kulik et al. |

It is certified that error appears in the above-identified patent and that said Letters Patent is hereby corrected as shown below:

On the Title Page

In item (72), in Column 1, in "Inventors", Line 1, delete "Petach" and insert -- Petah --.

Signed and Sealed this
Fifteenth Day of November, 2022

Katherine Kelly Vidal
*Director of the United States Patent and Trademark Office*